Figure 1:
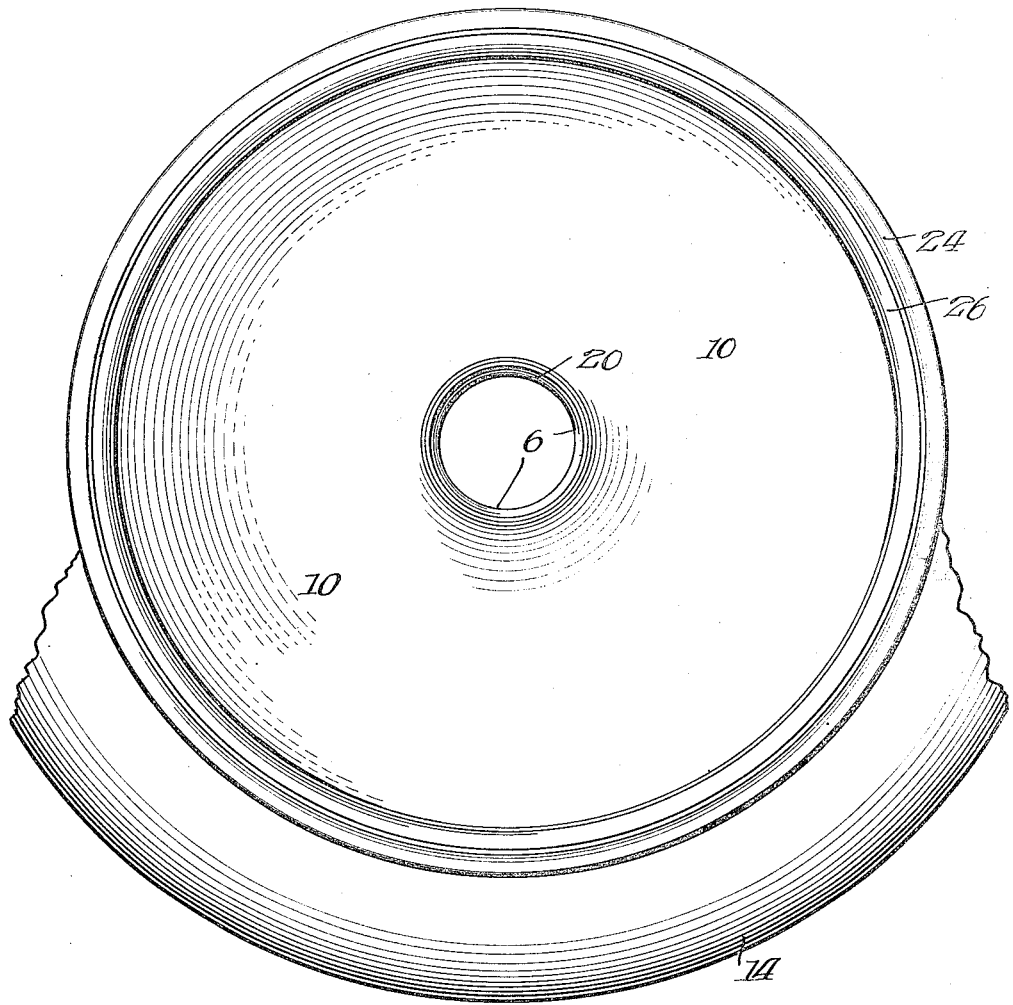

Aug. 28, 1923.

J. A. CHARTER 1,466,468

HOLLOW METAL WHEEL

Filed March 29, 1920 2 Sheets-Sheet 1

Inventor:
James A. Charter,
By Cheever & Cox
attys.

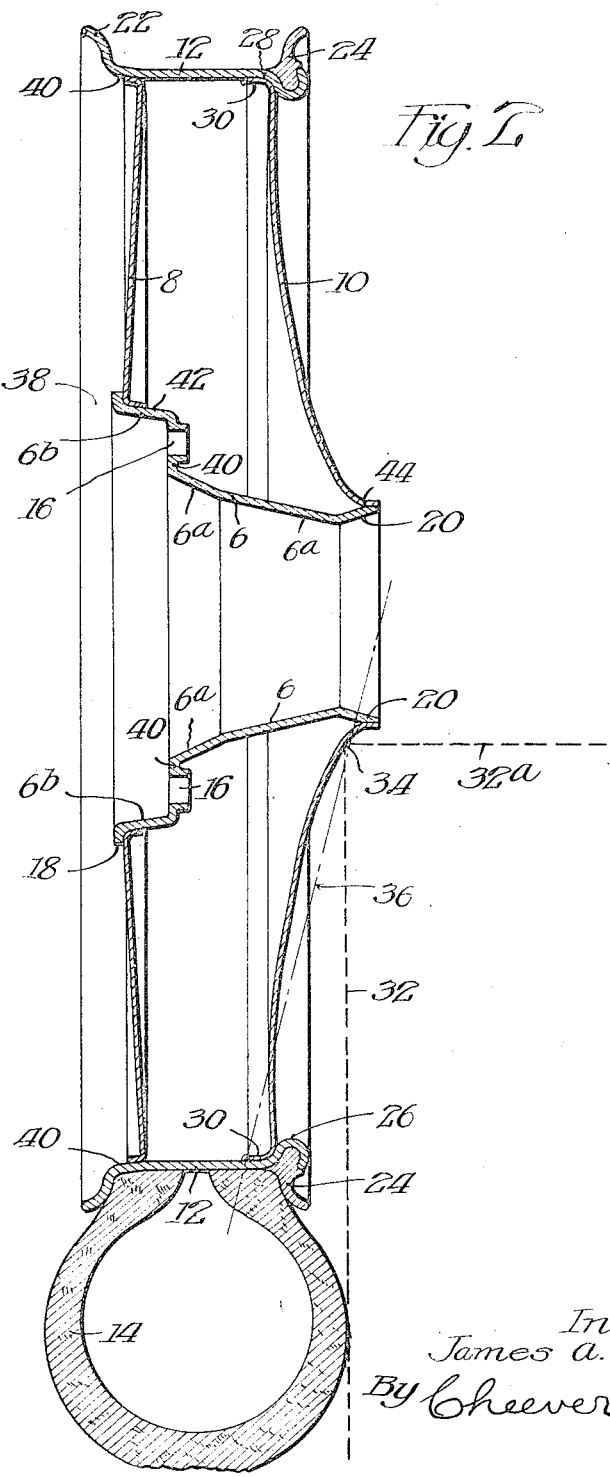

Patented Aug. 28, 1923.

1,466,468

UNITED STATES PATENT OFFICE.

JAMES A. CHARTER, OF CHICAGO, ILLINOIS.

HOLLOW METAL WHEEL.

Application filed March 29, 1920. Serial No. 369,650.

*To all whom it may concern:*

Be it known that I, JAMES A. CHARTER, a citizen of the United States, residing at Chicago, in the county of Cook and State of Illinois, have invented a certain new and useful Improvement in Hollow Metal Wheels, of which the following is a specification.

This invention relates to hollow sheet metal wheels of the separated disk or box type.

The objects of the invention are:—to construct such a wheel upon a shell hub large enough to so fit over the more or less permanent roller bearing hub on the axle of the automobile at its manufacture that the bearings in said permanent wheel hub are in approximately the central tread of the wheel, and to do this in such a manner that the wheel is not subject to injury in striking the curb or "curbing"; to make the inner or back disk of the wheel particularly when used as a driving wheel of an annular disk of such short radial width that for a given size of wheel a maximum strength is produced with a given thickness of metal; to provide a front disk which while shaped to take care of the curbing situation is attached to the extreme outside rim of the hub far enough outside the plane of the wheel proper to strongly cross brace the structure and finally to so connect the front disk of the wheel to the rim that there is an effective lock between them, even in the accidental absence of welding, to insure satisfactory resistance of the wheel to side strain at the rim.

The invention consists in the wheel capable of accomplishing some or all of the foregoing objects and in features and details of construction hereafter more fully set forth in the specification and claims.

Referring to the drawings in which similar numerals represent the same parts thruout the several views, Figure 1 is a side view of a wheel of this invention looking at it from the right of Figure 2, showing, in a fragmentary way, a tire which the wheel normally carries in commercial use.

Figure 2 is a sectional detail view taken on the line 2—2 of Figure 1.

Broadly speaking and without going into detail, the wheel comprises the hub member 6, two spaced apart disks 8 and 10, joined thereto; and separated from each other; the outer circumferences of the disks being connected to the usual rim 12 on which the tire 14 is adapted to be applied by means not entering into this invention.

As automobile manufacturers at the present time equip their cars with wood or spoked wheels and the wheel of this invention will be very frequently used to replace such wooden wheels, the hub 6 forming the central portion of this wheel is of considerable importance in that it is of a size and type adapted to fit over and be secured to and driven from the permanent hub not shown of the ordinary automobile. Such permanent hub is, in the case of the front of the automobile, a roller bearing hub and in the case of the rear of the automobile, a fixed driving hub. In order to properly apply this wheel to either of these inner hubs the hub 6 is made of a central, more or less outwardly flaring portion 6ª, terminating at the rear of the wheel in a considerable enlarged and expanded portion 6ᵇ adapted to receive the driving flange portion of the inner hub so that securing or driving bolts can be passed thru such driving flange at the inner hub and the holes 16 provided for them as shown in the drawing. The result of this is that the circumference 18 of the inner edge of the hub is very materially larger than the circumference 20 of the outer or front edge of the hub.

It is found highly desirable to make the diameter of the hub end 18, referred to, at least twice as large as the diameter of the hub end 20, with the result that the disk 8, which carries the driving strain from the hub to the rim, is of very much less width than the annular width of the disk 10.

Therefore with disks of the same thickness of metal the disk 8 has a much greater strength or factor of safety and so not only transmits the driving strain to the rim but maintains the wheel very stiff. As disk 8 lies for practical purposes, in a plane parallel to the center plane through the tires it transmits the strain from the rim to the hub and vice versa, without tendency of the disk to buckle even when the lateral bracing of disc 10 is removed.

The rim 12 is provided with an inner flange 22 for retaining the tire and with an outer separable ring 24 for the same purpose. As the details of these parts do not go into the invention they are not more fully described.

The ring 24 or its equivalent is preferably carried in the recessed flange 26 formed on the front edge of the rim 12 and extending downward as shown toward the central axis of the wheel with the result that behind this flange 26 and adjacent to the under circumference of the rim 12 there is formed a curve 28 against which the upper circumference 30 of the disk 10 is adapted to fit and be welded as shown in the drawings. This downward curve 28 at the edge of the rim 12 is important in that it forms a seat on flange 26 against which the upper edge 30 of the disc 10 bears with the result that in case of a lateral strain acting right to left in Figure 2 against the tire and rim this flange bears against the edge 30 of disc 10 with the result that the parts hold together, even though welding between edge 30 and the curve 28 be defective. In actual practice it has been found that in case of defective welding along the curve 28 the wheel stood up and ran practically as well as though the welding at that point or along that line had been perfect.

The outer disk 10 is as described welded to the rim 12 along curve 28 and it is welded to the extreme outer circumference portion 20 of the hub 6. It is not a plain disk as in prior structures but is dished or curved in such manner that the face of the disk is thruout its greater portion entirely inside of a line 32 in contact with the outside circumference of the tire and parallel with the central plane of the wheel until it reaches the point 34 immediately adjacent to the outer circumference 20 of the hub 6. The result of this construction is that while the wheel has the advantage of the angular truss effect thru the imaginary line 36 leading from the lines of weld of the disk to the hub and rim, the disk is so shaped that when the wheel strikes the curbing represented by the line 32—32ᵃ the disk does not contact the curb except at the corner 34 which is immediately adjacent to the weld line between the disk and hub where there is sufficient strength to resist it and the wheel is not crushed in or distorted as would obviously be the case were the disk 10 made in a plane connecting the weld line 20 and 28. As a result of this construction the hub 6 can be made of greater axial width thus increasing the trussing effect produced by the angularity of disk 10 to the wheel tread axis of the wheel while at the same time protecting the wheel from curbing danger.

It is important in a wheel of this invention that the plane of the inner circumference 18 in the hub be located a substantial distance 38 inside of the extreme outer circumference of the rim 20—22, this to insure that the driving strain transmitted through the holes 16 is as near as possible in the central plane of the wheel.

It is also important that the outwardly flaring hub portion 6ᵃ be, i. e., have its wall 40 through which holes 16 pass, back of the plane of disk 8. This is shown and claimed in my prior application Serial Number 334,385, filed October 30, 1919.

One feature of the hub shown is that it is large enough to be placed over the permanent hub of any automobile on the market to bring the central or track plane of the wheel in the proper position to maintain the standard tread of the automobile this when this wheel is substituted for other wheels such as wood spoke wheels initially on such automobiles.

The rim 12 is preferably tapered on its under side in the surface 41—and in fact on its entire inner surface; also on the hub on the surface 42; also on the hub on the surface 44 so that the adjacent flanges of the adjacent disks fit on with practically a driving fit. This insures a tight fit of the disks when in position both before and after welding. This makes the wheel carry the load thru these contact surfaces and not thru the weld joints as takes place when a loose fit is used.

Having thus described my invention what I claim as new and desire to secure by Letters Patent, is:

1. In mechanism of the class described, a wheel structure comprising a hub, a rim, and front and rear disks connecting the hub and rim, the hub being of greater axial length than the width of the rim and having its front end extending outside the plane of the front edge of the rim, the front disk being curved or dished so that it does not pass outside the plane of the front edge of the rim until a point near the hub, for the purposes set forth.

2. In mechanism of the class described, a wheel structure comprising a hub, a rim, and front and rear disks connecting the hub and rim, the hub being of greater axial length than the width of the rim and having its inner end substantially inside the plane of the inner edge of the rim and its front end extending outside the plane of the front edge of the rim, the front disk being curved or dished so that it does not pass outside the plane of the front edge of the rim until a point near the hub, for the purposes set forth.

3. In a device of the class described, a metallic wheel comprising a rim, a hub, spaced apart metallic disks welded to the rim and the hub at the front and rear of the wheel, the hub being of generally conical form with its diameter at the inside of the wheel, approximately twice the diameter at the outside of the wheel, with the result that the radial width of the metal of the inner disk is very much less than the outer disk, for the purposes set forth.

4. In a device of the class described, a metallic wheel comprising a hub, a rim, spaced apart metallic disks connecting them, an inwardly turned flange on the outer edge of the rim forming an inwardly faced curve against which the outer edge of the outer disk abuts, for the purposes set forth.

5. In mechanism of the class described, a hub, a tire retaining rim and spaced apart disks connecting them, the inner disk being of less radial width of metal than the outer disk and lying in a plane parallel to the central plane of the rim and tire, the outer disk being angular thereto and farther away from the rear disk, at the center of the wheel than at the rim, the front disk being connected to the hub at a point substantially outside of the front plane of the rim, for the purposes set forth.

6. In mechanism of the class described, a wheel comprising a hub, a rim and two spaced disks connecting them, the rear disk being at substantially right angles to the axis of the hub and rim, the outer disk being at substantially right angles to the rim at the rim and bent outwardly to engage the hub at an acute angle.

In witness whereof, I have hereunto subscribed my name in the presence of two witnesses.

JAMES A. CHARTER.

Witnesses:
DWIGHT B. CHEEVER,
ANNA ROSENTHAL.